United States Patent [19]
Jamois et al.

[11] Patent Number: 5,632,884
[45] Date of Patent: May 27, 1997

[54] ASPHALT COMPOSITIONS, METHOD OF PREPARATION, AND USE

[75] Inventors: Didier Jamois, Sainte Adresse; Yannick Jolivet, Le Havre; Pierre Le Perchec, Lyon; Bernard Fixari, Vienne, all of France

[73] Assignee: Total Raffinage Distribution S.A., Puteaux, France

[21] Appl. No.: 367,096

[22] Filed: Dec. 30, 1994

[30] Foreign Application Priority Data

Dec. 30, 1993 [FR] France .................... 93 15890

[51] Int. Cl.$^6$ ................... C10C 3/00; C10C 3/02
[52] U.S. Cl. ................... 208/44; 208/39; 208/22; 208/23
[58] Field of Search ................. 208/39, 44, 22, 208/23

[56] References Cited

U.S. PATENT DOCUMENTS

| | | | |
|---|---|---|---|
| 3,287,296 | 11/1966 | Wittner | 260/222 |
| 4,011,184 | 3/1977 | van Reijendam et al. | 260/28.5 |
| 5,428,085 | 6/1995 | Burel et al. | 524/69 |

FOREIGN PATENT DOCUMENTS

| | | |
|---|---|---|
| 20547766 | 6/1993 | European Pat. Off. . |
| 2265823 | 10/1975 | France . |
| 2015536 | 9/1979 | United Kingdom . |
| 2074147 | 10/1981 | United Kingdom . |

*Primary Examiner*—Helane Myers
*Attorney, Agent, or Firm*—A. Thomas S. Safford, Esq.

[57] ABSTRACT

A modified or bridged asphalt composition. The composition can be obtained by treating at least one asphalt base with an acid-derived compound having at least two functional groups capable, respectively, of being grafted onto one or more sites located on two or more different aromatic entities of the asphalt base, so as to link said entities by bridging.

19 Claims, No Drawings

ASPHALT COMPOSITIONS, METHOD OF PREPARATION, AND USE

RELATED APPLICATIONS

This application claims priority from French application Ser. No. 93 15890, filed Dec. 30, 1993, incorporated herein by reference. Reference is also made to each of copending applications Serial Nos. 08/303,222, filed Sep. 8, 1994, now abandoned, and 08/166,642 and 08/166,641, both filed Dec. 14, 1993, now U.S. Pat. Nos. 5,428,085 and 5,414,029, respectively, each which is also incorporated herein by reference.

FIELD OF THE INVENTION

The invention relates to improved asphalt compositions, a process for making same and applications thereof. Documents cited below in the following text are hereby incorporated herein by reference.

BACKGROUND OF THE INVENTION

Asphalt can be obtained, in particular, from crude petroleum, by distillation thereof and/or by deasphalting the heavy fraction obtained by distillation or distillations. Depending on the origin of the crude petroleum, asphalt consists of varying proportions of paraffinic oils (aliphatic or naphthenic), aromatic oils, resins and asphaltenes (on this subject, attention is directed to European Patent [EP] 246 956 and its U.S. equivalent U.S. Pat. No. 4,810,367 both of which are owned by Applicants' assignee and are herein incorporated by reference).

Asphalt is a viscoelastic material: it has a tendency to harden and become brittle at low temperatures; and, it softens and can flow at elevated temperatures. Its temperature sensitivity varies depending on its origin and production method.

It is well known to modify asphalt by addition of a polymer. The polymer is added for the purpose of reducing the heat sensitivity of asphalt by extending its plasticity range (it increases softening temperature and/or reduces cold brittleness temperature). The addition of a polymer to asphalt poses compatibility problems leading to instability of the asphalt/polymer blend during storage, for example before the blend is applied to a road.

It is also known that the addition of a polymer to an asphalt does not increase appreciably the aging resistance of the asphalt as measured by the well-known rolling thin film oven test (RTFOT) (see AFNOR* method T66–032).

An asphalt is thought to be aging when its penetrability (determined by AFNOR method NFT66–004) does not decrease much as a result of the RTFOT test and when its softening temperature (determined by AFNOR method NFT66–008) does not increase much as a result of the same test.

It is also already known to modify asphalts chemically by grafting onto them a monoanhydride such as phthalic anhydride or maleic anhydride, as described in the journal "Materiales de construccion" V37 H205–1987, pages 49 to 56, and thus allegedly markedly reduce their heat sensitivity. However, Applicants or Applicants' assignee have found that the anhydrides described in this publication do not give satisfactory results.

British Patent [GB]-A-2 015 536 is directed to the grafting of a dihalopolybutadiene onto asphalt in the presence of zinc oxide as catalyst. The modified asphalt thus obtained can be blended with an elastomer, for example a polychloroprene or polynorbornene, or with a sequenced polymer, for example styrene-butadiene.

In contrast, Applicants have developed improved asphalts which at the same time exhibit reduced low-temperature sensitivity, good rheological properties at low and high temperature, good aging resistance and improved cohesiveness, without adding a polymer which would have the aforesaid drawbacks, and without adding a compound, such as a monofunctional compound, which would obtain unsatisfactory results.

OBJECTS AND SUMMARY OF THE INVENTION

Applicants have established that acid-derived difunctional chemical compounds preferably, certain classes thereof, surprisingly afford asphalts with a range of greatly improved properties, even when the starting asphalt base in the "as is" state is inadequate for use as road or industrial asphalt.

Thus, an object of the present invention is to provide improved asphalts with good rheological performance at low and high temperatures, good aging resistance and good cohesiveness by starting with asphalt bases which a priori may be difficult to use because of their inadequate properties.

To this end, an embodiment of the invention provides a modified asphalt composition.

The composition is preferably obtained by a process comprising treating at least one asphalt base with an acid-derived compound having at least two functional groups capable of being grafted onto one or several sites located on two or more different aromatic entities of the asphalt base so as to link said entities by bridging.

Thus, the invention in an embodiment comprehends a modified or bridged asphalt composition comprising an asphalt base or, at least one asphalt base; and the asphalt base having two or more different aromatic entities; wherein the two or more different aromatic entities are linked by bridging from an acid-derived compound having at least two functional groups grafted onto one or several sites located on the two or more different aromatic entities.

The invention further encompasses a modified or bridged asphalt composition characterized by having been obtained by treating at least one asphalt base with an acid-derived compound containing at least two functional groups capable of being grated onto one or more sites located on two or more different aromatic entities of the asphalt base so as to link the entities by bridging.

The preparation and the applications of the compositions constitute other embodiments of the invention.

Thus, the invention provides in another embodiment a process for making a modified or bridged asphalt composition comprising treating an asphalt base with an acid-derived compound having at least two functional groups, wherein the asphalt base has at least two different aromatic entities and, by the treating, the acid-derived compound is grafted onto one or several sites located on the at least two different aromatic entities.

The functional groups therefore are preferably capable of being grafted onto the one or several sites on the at least two different aromatic entities. The process is preferably carried out at suitable conditions for the treating to effect grafting. Such conditions are preferably a temperature above softening temperature, agitation and, for a period of time sufficient to attain bridging of the two aromatic entities by the acid-derived compound. Imparting agitation and temperature can be by any suitable means, including without limitation applying heat and stirring or shaking.

The treatment further is preferably performed at a temperature of 130° to 300° C., more preferably 160° to 230° C. The treatment preferably comprises bubbling a gas, such as air, or constituents thereof, in any combination through the asphalt base to which the acid-derived compound has been added. Thus, applying heat and agitation can be performed by one or several means.

The invention accordingly further comprehends a process for preparing a modified or bridged asphalt composition from an asphalt base comprising grafting an acid-derived compound having at least two functional groups capable of being so grafted onto one or several sites located on two or more different aromatic entities of the asphalt base, so as to link the entities by bridging.

The process is preferably performed at conditions suitable for such grafting; for instance, preferably a temperature above the softening temperature of the asphalt base, agitation and, for a period of time sufficient for attaining the bridging. The grafting is preferably by adding the acid-derived compound to the asphalt base or treating the asphalt base with the acid-derived compound. The temperature is preferably 130° to 300° C., more preferably 160° to 230° C. The treating can compromise bubbling a gas, such as air or constituents thereof in any combination, through the asphalt base to which the acid-derived compound has been added.

The acid-derived compound having at least two functional groups is preferably selected from difunctional and polyfunctional compounds such as aromatic or aliphatic dianhydrides, and dihalides of aromatic or aliphatic acids; e.g., $C_2$–$C_{20}$ aliphatic dianhydrides, or dihalides of $C_2$–$C_{20}$ aliphatic acids, or 5 to 8 membered (each ring) aromatic dianhydrides, or dihalides of 5 to 8 membered (each ring) aromatic acids; for instance, phthalic dianhydride, adipoyl dichloride, and terphthaloyl dichloride. The term "5 to 8 membered (each ring)" is used because rings of aromatics may be linked and, each ring can contain a heteroatom (in addition to carbon); for instance, phthalic dianhydride may be considered 1, 2, 4, 5-benzenetetracarboxylic dianhydride $[C_6H_2((CO)_2O)_2]$ which has a benzene ring linked to two 5-membered hetero rings, each of which share two carbon atoms of the benzene ring, e.g.,

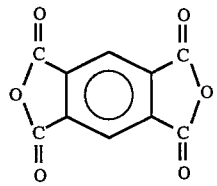

Likewise, adipolyl dichloride may be considered the dichloride of adipic acid [COOH(CH$_2$)$_4$COOH], e.g., COCl(CH$_2$)$_4$COCl. Terephthaloyl dichloride, in contrast to phthalic dianhydride, can also be considered terephthaloyl chloride, $C_6H_4$ (COCl)$_2$, e.g.,

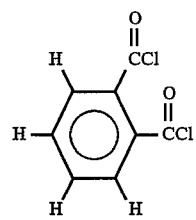

Of course, the invention includes asphalt compositions from the processes of the invention. Thus, a simple expression of an embodiment of the invention is: an asphalt composition having a difunctional, acid-derived compound grafted, or bridged, via two or more different aromatic entities of asphalt base origin.

In the compositions of the invention, the acid-derived compound is preferably present in the composition, or preferably incorporated into the asphalt base, at a concentration of 0.05 to 10 wt%, more preferably 0.1 to 3 wt% based on the weight of the asphalt base; and, in the processes of the invention, preferably 0.05 to 10 wt%, more preferably 0.1 to 3 wt% of the acid-derived compound is added to or used in treatment or grafting of the asphalt base.

The invention further comprehends uses of the compositions of the invention; for instance, a road asphalt, aqueous asphalt emulsion or water-free surface coating composition comprised of the aforementioned inventive compositions.

These and other objects and embodiments are disclosed or are obvious from the following detailed description.

DETAILED DESCRIPTION

For purposes of this disclosure;

—The term, "aromatic entity" means a grouping of at least one hydrocarbon molecule with at least one aromatic ring. The ring can possibly bear at least one hydrocarbon chain or no such chain and, the molecule can possibly contain a heteroatom such as sulfur, oxygen or nitrogen, or a metal such as nickel or vanadium. The hydrocarbon chain can be branched or straight chained and can preferably have two to twenty carbon atoms and, each ring can preferably have at least five members, more preferably six to eight members.

—The term, "bridging" means a chemical link between two aromatic entities provided by a difunctional molecule.

—The term "treatment" of the asphalt base (or "treating") preferably includes agitating a mixture of the asphalt base and the compound at a temperature above the softening temperature of the base, for a time sufficient to bring about bridging of two aromatic entities of the base by means of the compound.

The effects of this treatment are only hypotheses formulated by the Applicants and apparently confirmed by the tests performed; however, Applicants' invention and the claims appended are not necessarily to be viewed as limited by, or including as limitations, the effects of treatment set forth herein, as Applicants do not necessarily wish to be limited to any one particular theory, especially taking into consideration the complexity of asphalt compositions. Thus, the invention comprehends simply reacting or even blending an acid-derived compound having at least two functional groups with an asphalt base having two or more different aromatic entities and compositions therefrom.

For purposes of the present invention, the asphalt, also referred to as asphalt base, that can be utilized in the improved compositions can be a "natural" or "synthetic" asphalt and preferably is an asphalt derived from crude petroleum, bituminous schists, heavy oils, bituminous sands or even coal.

Asphalt can be, for example:
a) the heaviest fraction obtained by direct distillation of a crude petroleum at atmospheric or reduced pressure;
b) the heavy phase obtained by solvent deasphalting of a heavy fraction obtained as under a);
c) the product of oxidation, in the presence or absence of a catalyst, of a heavy fraction as under a) or of a heavy phase as under b);
d) the product of oxidation, in the presence or absence of a catalyst, of a blend of a heavy fraction as under a) or of a heavy phase as under b); and
—a petroleum distillate, or
—an aromatic extract obtained in the dearomatization of lubricating oils; or
—a deasphalting pitch;
e) a blend of an oxidized product obtained as under c) or d) or a hard base; and
—a petroleum distillate, or
—an aromatic extract obtained in the dearomatization of lubricating oils; or
—a deasphalting pitch, or
—a heavy fraction as under a) or a heavy phase as under b);
f) a visbroken base, alone or in admixture with one of the aforesaid materials;
g) one of products a) to f) in admixture with:
—a petroleum distillate; or
—an aromatic extract obtained in the dearomatization of lubricating oils; or
—a deasphalting pitch; or
—a heavy aromatic fraction (slurry) obtained by a catalytic cracking process.

Product g), such as a visbroken base, f), in admixture with an aromatic extract or slurry is a presently preferred asphalt or asphalt base.

The compositions according to the invention are obtained from at least two reactants: a first reactant being an asphalt base such as indicated hereinabove and preferably having an asphaltene content (determined in accordance with AFNOR method NFT60–115) of at least 1 wt %, and, the second reactant being an acid-derived compound preferably selected from the following classes of difunctional and polyfunctional reactants:
—aromatic and aliphatic dianhydrides,
—dihalides of aromatic and aliphatic acids.

In general, the reaction can be carried out at atmospheric pressure in a reactor equipped with an outlet for carbon dioxide or other gas such as gaseous halogenated acid which may be formed during the reaction. The reaction temperature is preferably such that the asphalt is soft, namely preferably above about 130° C., but not too hot, such as below about 300° C., to prevent asphalt degradation. Especially when the second reactant is an acid dihalide or dianhydride and the reaction temperature is preferably from about 160° C. to about 230° C., the reaction is preferably carried out with vigorous agitation. Of course, without undue experimentation from this disclosure, the skilled artisan can vary temperatures, such as by adjusting pressure accordingly.

Regardless of the type of chemical reactant used as the second reactant, the content of the second reactant is preferably at least about 0.05 wt%, more preferably from about 0.05 to about 10 wt%, and most preferably from about 0.1 to about 3 wt%, based on the weight of the asphalt base. The duration of the reaction is preferably from about 1 to about 30 hrs, more preferably from about 1 to about 5 hours.

In general, bubbling a gas through the reaction mixture is desirable for better homogenization of said mixture. Air bubbling is preferably used. However, any suitable gas may be employed, including any of the noble or inert gases, or constituents of air in any suitable combination. Typically, a catalyst is not needed in the process of the invention.

The compositions of the present invention, especially those obtained by the inventive process, exhibit surprising improvements in any or all of the following properties:
—a Fraass point of −13° C. or lower, preferably −20° C.,
—good storage stability, as indicated by a low "Δ ring-and-ball temperature value",
—a viscosity at 60° C. that is much higher than that of the starting asphalt.

As to these properties of the asphalt base modified according to, and the asphalt composition of, the invention, and, in this description:
1. the Fraass point, indicator of low-temperature brittleness, is determined by AFNOR method T66–026;
2. the storage stability is determined by storing a sample of the composition in a cylindrical container at 165° C. for 4 days and determining its ring-and-ball temperature (AFNOR method NFT66–008) and the penetrability of the upper and lower layers of the sample (AFNOR method NFT66–004).

The difference between the ball-and-ring temperatures, namely the Δ ball-and-ring temperature value, and the difference in penetrability between the upper and lower layer, namely the Δ penetrability value, can be obtained in this manner. The smaller the Δ values, the more stable are the compositions.

The improved asphalt compositions according to the invention combine good high-temperature and low-temperature resistance with good aging resistance, better cohesiveness and good storage stability.

The inventive compositions can be used for road as well as industrial applications.

In applications, such as, road or coating applications, the compositions can be used with or without conventional aggregates and fillers:
a) as is, to prepare road asphalts with good rutting resistance and good fatigue resistance; or,
b) as is or diluted with a hydrocarbon cut to prepare aqueous asphalt emulsions (the aqueous carrier alone or with the hydrocarbon cut, if present, being termed generally as "carrier"; emulsions can contain emulsifying agents and optionally additives); or,
c) diluted with a hydrocarbon cut, solvent or diluent, to prepare water-free surface coatings or compositions therefor.

The invention further comprehends coatings from evaporating carrier, for instance, aqueous carrier in the aqueous asphalt emulsions or hydrocarbon cut from the composition for a water-free surface coating. Of course, the water-free surface coating from diluting the asphalt composition with a hydrocarbon can be used as a coating (i.e., can be a coating) without evaporation of the hydrocarbon.

In regard to uses of asphalt compositions and constituents for emulsions, coatings and road asphalts, attention is directed to the copending applications cited and incorporated by reference above (see text under RELATED APPLICATIONS).

The invention also comprehends kits for preparing the composition or, to prepare the aqueous emulsions or the water-free dilutions (compositions of or for a water-free surface coating).

For instance, the invention comprehends a kit for preparing a modified or bridged asphalt, comprising: (a) at least one asphalt base, (b) at least one acid derived compound, and optionally (c) (i) an aqueous carrier such as water or (c)(ii) a hydrocarbon cut, or both (c) (i) and (c) (ii), wherein constituents (a) and (b), or, (a), (b) and (c) (i), or, (a), (b) and (c) (ii), or, (a), (b), (c) (i) and (c) (ii), are separately packaged. The kit further preferably comprises instructions for treating (a) with (b) to prepare the modified or bridged asphalt composition; and optionally for adding the aqueous carrier or the hydrocarbon to prepare the emulsion or the water-free coating composition; and, even further optionally for applying the emulsion or coating composition and/or for evaporating the aqueous carrier or the hydrocarbon to obtain a coating from the emulsion or coating composition (of course, as stated above, in use of water-free coating compositions as a coating, the hydrocarbon need not necessarily be evaporated).

of the bases was introduced into a reactor at a pressure of $10^5$ Pa and a temperature of 200° C. The treatment was carried out over a period of 16 hrs at an air flow rate of 7.5 L/h.

Bases $V_0$ and $X_0$ to which phthalic dianhydride had been added were subjected to the same treatment.

In this description:

—V31 is the composition obtained from base $V_0$ and 3 wt % of phthalic dianhydride, —X31 is the composition obtained from base $X_0$ and 3 wt % of phthalic dianhydride, —X51 is the composition obtained from base $X_0$ and 5 wt % of phthalic dianhydride, and —V'31 is the composition obtained from base $V_0$ and 3 wt % of phthalic monoanhydride.

The properties of these compositions are given in the following Table II:

TABLE II

| COMPOSITIONS | V | X | V31 | X31 | X51 | V'31 |
| --- | --- | --- | --- | --- | --- | --- |
| Fraass point, °C. | Not measurable | | −21 | −19 | −19 | Not measured |
| Ring-and-ball temperature, °C. | 37.9 | 41.7 | 43.5 | 51.8 | 53.8 | 38.5 |
| Penetrability in 1/10th of a millimeter at 25° C. | 209 | 128 | 97 | 72 | 62 | 250 |
| Dynamic viscosity at 60° C. before aging. Rate: 0.05 s$^{-1}$ | 450 | 850 | 1650 | 5580 | 9900 | 530 |
| Dynamic viscosity at 60° C. after RTFOT aging. Rate: 0.05 s$^{-1}$ | 1190 | 2970 | 5910 | 22300 | 78500 | 1500 |

The invention may be further illustrated by the following non-limiting examples, many apparent variations of which are possible without departing from the spirit of the invention.

EXAMPLE 1

This example concerns the preparation of improved asphalt compositions according to the invention by use of a dianhydride as the second reactant.

Two asphalt bases referred to as $V_0$ and $X_0$ were used. They consisted of mixtures of visbreaking residues obtained by distillation under reduced pressure and an aromatic extract, and in the "as is" state were unusable as asphalt. The properties of these bases are given in the following Table I:

TABLE I

| ASPHALT BASE | $V_0$ | $X_0$ |
| --- | --- | --- |
| Ring-and ball temperature, °C. | Not measurable because the base is to soft | 40 |
| Penetrability in 1/10th of a millimeter, at 25° C. | Note measurable because the base is too soft | 200 |
| Kinematic viscosity at 100° C. in mm$^2$/s | 600 | not measured |

V and X refer to asphalt bases $V_0$ and $X_0$ after these bases were treated under the following operating conditions. One The storage stability required no measurement, because the absence of aggregates in the mixture indicated good stability.

The results presented in Tables I and II show that compositions V31, X31 and X51, obtained by reaction of phthalic dianhydride with different asphalt bases, have at the same time a good Fraass point and good dynamic viscosity compared to the properties determined for asphalt bases V, $V_o$, $X_o$ and X alone and as well as for composition V'31.

EXAMPLE 2

This example concerns the preparation of improved asphalt compositions according to the invention by use of acid dihalide as the second reactant.

Two asphalt bases referred to as $V_0$ and $X_0$ were used. They consisted of mixtures of visbreaking residues obtained by distillation under reduced pressure and an aromatic extract and in the "as is" state were unusable as asphalt. The properties of these bases are presented in Table I of Example 1.

As before, V and X refer to asphalt bases $V_0$ and $X_0$ after they had been treated under the following operating conditions. One of the bases $V_e$ or $X_0$ was introduced into a reactor at a pressure of $10^5$ Pa and a temperature of 200° C. The treatment was carried out over a period of 16 hrs at an air flow rate of 7.5 L/h.

Bases $V_0$ and $X_0$ to which adipoyl dichloride had been added as reactant were subjected to the same treatment.

V32 is the composition obtained from base $V_0$ and 3 wt % of adipoyl dichloride and, X32 is the composition obtained from base $X_0$ and 3 wt % of adipoyl dichloride.

Bases V₀ and X₀ to which terephthaloyl dichloride had been added as reactant were subjected to the same treatment.

V'52 is the composition obtained from base $V_0$ and 5 wt % of terephthaloyl dichloride, X'32 is the composition obtained from base $X_0$ and 3 wt % of terephthaloyl dichloride; and, X'52 is the composition obtained from base $X_0$ and 5 wt % of terephthaloyl dichloride.

The properties of these compositions are given in the following Table III:

TABLE III

| COMPOSITIONS | V | X | V32 | X32 | V'52 | X'52 | X'32 |
|---|---|---|---|---|---|---|---|
| Fraass point, °C. | Not measurable | | −16 | −15 | −17 | −15 | −18 |
| Ring-and-ball temperature, °C. | 37.9 | 41.7 | 41.6 | 49.2 | 48.7 | 54.8 | 50.8 |
| Penetrability in 1/10th of a millimeter at 25° C. | 209 | 128 | 133 | 76 | 93 | 60 | 70 |
| Dynamic viscosity at 60° C. before aging. Rate: 0.05 s⁻¹ | 450 | 850 | 1430 | 3550 | 3320 | 13120 | 5250 |
| Dynamic viscosity at 60° C. after RTFOT aging. Rate: 0.05 s⁻¹ | 1190 | 2970 | 4410 | 20270 | 9960 | 50560 | 22420 |

The storage stability required no measurement, because the absence of aggregates in the mixture indicated good stability.

The results presented in Tables I and III show that compositions V32 and X32, obtained by reaction of adipoyl dichloride and bases $V_0$ and $X_0$, respectively and compositions V'52, X'52 and X'32, obtained by reaction of terephthaloyl dichloride and bases $V_0$ and $X_0$, have at the same time good dynamic viscosity and a good Fraass point compared to the properties determined for asphalt bases V, $V_o$, $X_o$ and X alone.

Having described in detail preferred embodiments of the present invention, it is to be understood that the invention defined by the appended claims is not to be limited by particular details set forth in the above description as many apparent variations thereof are possible without departing from the spirit or scope of the present invention.

What is claimed is:

1. A modified asphalt composition, said composition having been obtained by a process consisting essentially of treating at least one asphalt base with an acid-derived compound containing at least two functional groups capable of being grafted, respectively, onto one or more sites located on two or more different aromatic entities of the asphalt base, so as to effect grafting of such functional groups at such sites and thereby to link said entities by bridging through said acid-derived compound and thus modify the asphalt base and obtain the modified asphalt composition, wherein the acid-derived compound is selected from the group consisting of a dianhydride and an acid dihalide.

2. The composition according to claim 1, wherein the dianhydride is phthalic dianhydride.

3. The composition according to claim 1, wherein the acid dihalide is selected from the group consisting of adipoyl dichloride and terephthaloyl dichloride.

4. The composition according to claim 1 wherein the acid-derived compound having at least two functional groups capable of being grafted onto the aromatic entities has been incorporated into the asphalt base at a concentration of 0.05 to 10 wt %, based on the weight of said asphalt base.

5. The composition according to claim 4 wherein the acid-derived compound having at least two functional groups capable of being grafted onto the aromatic entities has been incorporated into the asphalt base at a concentration of 0.1 to 3.0 wt %, based on the weight of said asphalt base.

6. The composition according to claims 1 wherein the asphalt base is a mixture of a visbroken base and an aromatic extract or a slurry.

7. Road asphalt comprised of a modified asphalt composition, said modified asphalt composition consisting essentially of the composition of claim 1.

8. An aqueous asphalt emulsion comprised of a modified asphalt composition, said modified asphalt composition consisting essentially of the composition of claim 1.

9. An asphalt coating obtained by evaporating carrier from the emulsion of claim 8.

10. A water-free surface coating or composition therefor comprised of a modified asphalt composition, said modified asphalt composition consisting essentially of the composition of claim 1.

11. A process for preparing a modified asphalt composition consisting essentially of treating an asphalt base having at least two aromatic entities with at least one acid-derived compound having at least two functional groups, each group being capable of being grafted onto a site of the two aromatic entities of the asphalt base, the treatment being carried out under conditions suitable for attaining bridging of the two aromatic entities by said acid-derived compound, whereby the asphalt base is modified and the modified asphalt base is obtained, wherein the acid-derived compound is selected from the group consisting of a dianhydride and an acid dihalide.

12. The process of claim 11 wherein the conditions include a temperature above the softening temperature of the asphalt base with agitation and for a period of time sufficient for attaining bridging of the two aromatic entities by the compound.

13. The process of claim 12 wherein the treatment of the asphalt base is carried out at a temperature of about 130° to about 300° C.

14. The process of claim 13 wherein the treatment of the asphalt base is carried out at a temperature of about 160° to about 230° C.

15. The process of claim 11 wherein the treatment of the asphalt base comprises adding the acid-derived compound to the asphalt base or adding the asphalt base to the acid-derived compound, and bubbling a gas through the base to which the acid-derived compound had been added or, through the base which has been added to the acid-derived compound.

16. A modified asphalt composition consisting essentially of an asphalt base having two or more different aromatic entities; wherein the two or more different aromatic entities are linked by bridging from an acid-derived compound having at least two functional groups grafted onto one or several sites located on the two or more different aromatic entities thereby modifying the asphalt base and providing the modified asphalt composition; and, wherein the acid-derived compound is selected from the group consisting of a dianhydride and an acid dihalide.

17. A kit for preparing (I) a modified asphalt composition as claimed in claim 16, or (II) an emulsion of the composition (I), or (III) a water-free composition of the composition of (I), consisting essentially of: (a) at least one asphalt base, (b) at least one acid-derived compound selected from the group consisting of a dianhydride and an acid dihalide, and optionally (c) (i) an aqueous carrier, or, (c) (ii) a hydrocarbon cut, solvent or diluent, or, both (c) (i) and (c) (ii); wherein constituents (a) and (b), or, (a), (b) and (c) (i), or, (a), (b) and (c) (ii), or (a), (b), (c) (i) and (c) (ii) are separately packaged.

18. A process for preparing a modified asphalt composition from an asphalt base consisting essentially of grafting an acid-derived compound having at least two functional groups capable of being so grafted onto one or several sites located on two or more different aromatic entities of the asphalt base, so as to link the entities by bridging and thereby modify the asphalt base and provide the modified asphalt composition, wherein the acid-derived compound is selected from the group consisting of a dianhydride and an acid dihalide.

19. A kit for preparing (I) a modified asphalt composition as claimed in claim 1, or (II) an emulsion of the composition (I), or (III) a water-free composition of the composition of (I), consisting essentially of: (a) at least one asphalt base, (b) at least one acid-derived compound selected from the group consisting of a dianhydride and an acid dihalide, and optionally (c) (i) an aqueous carrier, or, (c) (ii) a hydrocarbon cut, solvent or diluent, or, both (c) (i) and (c) (ii); wherein constituents (a) and (b), or, (a), (b) and (c) (i), or, (a), (b) and (c) (ii), or (a), (b), (c) (i) and (c) (ii) are separately packaged.

* * * * *